UNITED STATES PATENT OFFICE.

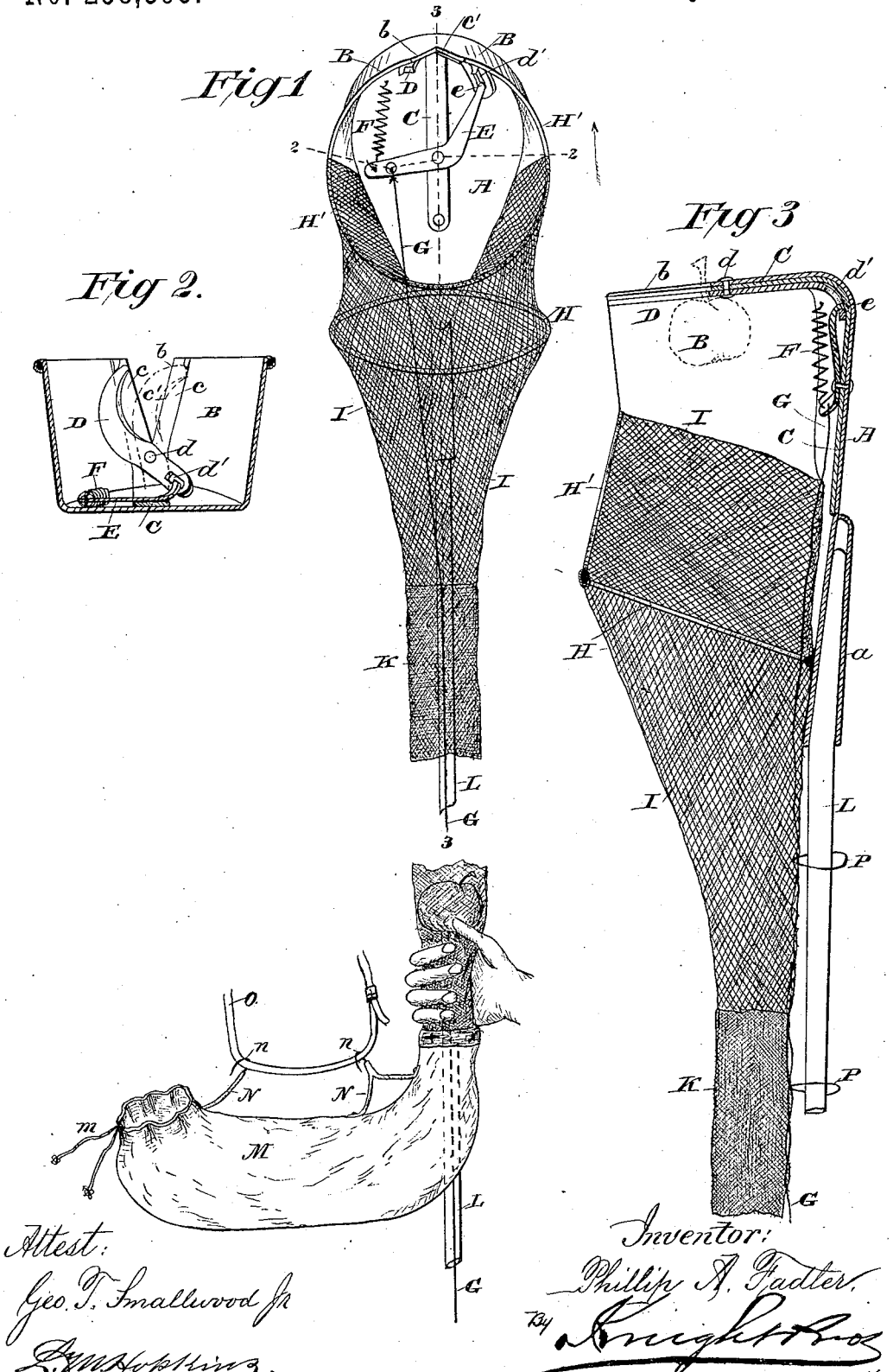

PHILLIP A. FADLER, OF ST. LOUIS, MISSOURI.

FRUIT-GATHERER.

SPECIFICATION forming part of Letters Patent No. 258,395, dated May 23, 1882.

Application filed June 24, 1881. (No model.)

*To all whom it may concern:*

Be it known that I, PHILLIP A. FADLER, of the city of St. Louis, in the State of Missouri, have invented a new and useful Improvement in Fruit-Gatherers, of which the following is a specification.

My improvement relates to that form of fruit-gatherer in which a hose or tube is connected with the hood or receptacle and a knife cuts shearwise across a V-shaped opening in which the stems of the fruit being gathered are inserted and severed.

In order that my invention may be fully understood, I will proceed to describe it with reference to the accompanying drawings, in which—

Figure 1 is a front view of my improved fruit-gatherer, the middle portion of the hose or tube and of the pole being removed. Fig. 2 is a horizontal section on the line 2 2, Fig. 1, looking upward, the net beneath the receptacle being removed and the closed position of the cutter shown in broken lines. Fig. 3 is a vertical section on the line 3 3, Fig. 1, showing the manner of connecting the cutting device with the hose or tube.

A may represent a back, of metal or other suitable material, whose lower part is provided with a socket, *a*, in one piece therewith. Secured to the top of the plate, and in front thereof, is an arched plate or hood, B, of metal or other suitable material, formed with a V-shaped slot or opening, *b*, guarded by the arms *c c* (having beveled sharp edges *c' c'*) of a Y-shaped or branched plate, C, whose base extends down the back A. The arms *c c* form cutting-blades, over which a curved knife, D, having a pivot, *d*, at the rear of the opening, works by the action of a bell-crank lever, E, pivoted to the plate C, and having slot *d'* and stud *e* connection with the rear end of the knife D. The inner end of the lever E is connected by a suitable spring, F, with the back A, that tends to hold back the knife D, while a cord, G, secured to the lever at the opposite side thereof, connects the lever with the means for pulling on the lever to operate the knife.

H H' are two rings, one ring, H', being vertical, or nearly so, and having its upper part bound into the front edge of the hood B from the side of the slot *b*, the lower part being rigidly secured to the other ring, H, which is horizontal, or nearly horizontal, and extends back to the back or socket *a*, where it is firmly fastened, thus forming an angle to the front ring, H'.

From the lower edge of the hood B extends a net, I, which, with the hood and back, forms the receptacle for the fruit being gathered.

The lower end of the netting is attached to a light hose or tube, K, of suitable material and of sufficient size to admit the fruit, as shown in Fig. 3.

L is a sectional pole, whose upper end is inserted in the socket *a*, and which can, by joining the different lengths, as usual, be extended to any desired length. The hose or tube is also in sections, secured together by buttons and button-holes. To the lower end of the hose is attached a bag, M, in which the fruit is deposited until sufficient is picked to fill the bag, whose mouth is provided with a draw-string, *m*, to close it. To the sides of the bag are secured straps N, provided with hooks *n*, by which it is hung to a buckle neck-strap, O.

G is a cord or string by which the knife is closed, and which extends downward and is secured to the hose or tube. The hose is held to the pole by means of loops P.

The operation of the device is as follows: The pole and hose being fitted to the desired length and the bag M fastened to the lower end of the hose K, the operator puts the strap O over his head and shoulder, attaches the bag by means of the hooks *n*, when the draw-string *m* will close the mouth. Then, taking the pole in one hand, the operator grasps the hose with the other, at the same time steadying the pole with the same hand, thrusts the ring H' over the fruit on the tree, when the stem will enter the slot *b* in the front of the hood, as shown in Fig. 3. Then by giving the hose a slight jerk the cord P will be drawn down and the knife closed, as shown by the dotted lines in Fig. 2, cutting the stem. The fruit will drop through the net into the hose, where it is caught by the hand, as shown in Fig. 1. Then sliding the hand down the hose to the bag, by simply opening the hand the fruit will roll into the bag.

When the operator has as much fruit in the bag as he wants to carry he unhooks the drawstring from the strap, draws the mouth open, and lets the fruit roll into a basket or other receptacle.

Having thus described my invention, the following is what I claim as new therein and desire to secure by Letters Patent:

1. The combination of back A, hood B b, plate C c c', curved knife D, having pivot d, lever E, slot-and-stud connection d' e, spring F, and cord G, as set forth.

2. The combination of gatherer A B b C c c', wire rings H H', netting I, hose K, knife D, lever E, spring F, cord G, and pole L.

PHILLIP A. FADLER.

Witnesses:
FRED RAUM,
ROBT. E. COLLINS.